US010198125B2

(12) United States Patent
Wang et al.

(10) Patent No.: US 10,198,125 B2
(45) Date of Patent: Feb. 5, 2019

(54) FORCE SENSOR RECALIBRATION

(71) Applicant: SYNAPTICS INCORPORATED, San Jose, CA (US)

(72) Inventors: Ying Wang, Fremont, CA (US); Adam L. Schwartz, Redwood City, CA (US); Sanjay Mani, Los Altos Hills, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 33 days.

(21) Appl. No.: 15/450,823

(22) Filed: Mar. 6, 2017

(65) Prior Publication Data

US 2017/0277350 A1    Sep. 28, 2017

Related U.S. Application Data

(60) Provisional application No. 62/311,621, filed on Mar. 22, 2016.

(51) Int. Cl.
| | |
|---|---|
| *G01L 1/14* | (2006.01) |
| *G06F 3/041* | (2006.01) |
| *G06F 3/044* | (2006.01) |
| *H03K 17/96* | (2006.01) |
| *B81B 3/00* | (2006.01) |
| *G06F 3/0354* | (2013.01) |
| *G01L 9/12* | (2006.01) |
| *G01L 1/04* | (2006.01) |
| *G06F 3/01* | (2006.01) |

(52) U.S. Cl.
CPC ............ *G06F 3/0418* (2013.01); *G06F 3/044* (2013.01); *G06F 2203/04105* (2013.01); *G06F 2203/04108* (2013.01)

(58) Field of Classification Search
CPC ..... G06F 3/0414; G06F 3/016; G11B 5/4555; G01L 1/146
See application file for complete search history.

(56) References Cited

U.S. PATENT DOCUMENTS

| | | | |
|---|---|---|---|
| 8,735,755 B2* | 5/2014 | Peterson | H03K 17/962 200/600 |
| 2002/0091039 A1* | 7/2002 | Reinbold | A63B 21/0023 482/1 |
| 2006/0028095 A1* | 2/2006 | Maruyama | G06F 3/011 310/316.01 |
| 2007/0257821 A1* | 11/2007 | Son | G06F 3/016 341/22 |

(Continued)

*Primary Examiner* — Lin Li
(74) *Attorney, Agent, or Firm* — Paradice and Li LLP (57) ABSTRACT

Embodiments described herein include a method for calibrating capacitive force sensors. The method includes measuring a force level at each of a first electrode and a second electrode. The method also includes determining an expected force level at the second electrode based on the measured force level at the first electrode and a force contribution ratio for the second electrode. The method includes determining a difference between the measured force level at the second electrode and the expected force level at the second electrode and adjusting a force weighting factor for the second electrode in response to the difference exceeding a predetermined threshold to create an adjusted force weighting factor. The method also includes adjusting the measured force level at the second electrode.

20 Claims, 7 Drawing Sheets

(56) References Cited

U.S. PATENT DOCUMENTS

| | | | | |
|---|---|---|---|---|
| 2009/0033341 A1* | 2/2009 | Son | ............ | G01L 1/146 324/663 |
| 2009/0243817 A1* | 10/2009 | Son | ............ | G06F 3/0414 340/407.2 |
| 2009/0321232 A1* | 12/2009 | Naito | ............ | B81B 3/0078 200/181 |
| 2011/0278078 A1* | 11/2011 | Schediwy | ............ | G01L 1/146 178/18.06 |
| 2012/0038583 A1* | 2/2012 | Westhues | ............ | G06F 3/0412 345/174 |
| 2012/0162114 A1* | 6/2012 | Inoue | ............ | G06F 3/016 345/173 |
| 2014/0002114 A1* | 1/2014 | Schwartz | ............ | G06F 3/044 324/679 |
| 2014/0137670 A1* | 5/2014 | Hata | ............ | G01L 1/144 73/862.621 |
| 2016/0291761 A1* | 10/2016 | Huie | ............ | G06F 3/0414 |
| 2017/0102809 A1* | 4/2017 | Son | ............ | G06F 3/0414 |
| 2017/0122825 A1* | 5/2017 | Naumann | ............ | G01L 9/0072 |
| 2017/0191882 A1* | 7/2017 | Okada | ............ | G01L 1/04 |
| 2017/0220183 A1* | 8/2017 | Kim | ............ | G06F 3/0412 |
| 2017/0249028 A1* | 8/2017 | Marshall | ............ | G06F 3/03545 |

* cited by examiner

| POSITION 410 | A | B | C | D | E | F | G | H | I | | |
|---|---|---|---|---|---|---|---|---|---|---|---|
| BEFORE TEST | 1045 | 1489 | 356 | 441 | 421 | 211 | 809 | 823 | 363 | SUM | 5958 |
| AFTER TEST | 136 | 787 | 259 | 217 | 439 | 192 | 366 | 1085 | 408 | SUM | 3889 |
| COMPENSATOR(K) | 400 | 197 | 143 | 212 | 100 | 115 | 230 | 79 | 300 | | |
| AFTER CALIBRATION | 544 | 1553 | 371 | 460 | 439 | 220 | 844 | 858 | 1224 | SUM | 6513 |

FIG. 5

| A | B | C | D | E | F | G |
|---|---|---|---|---|---|---|
| ERROR=(MAX-MIN)/(MAX+MIN) | PHONE 1 BEFORE AUTO CALIBRATION | 1 AFTER AUTO CALIBRATION | 2 BEFORE AUTO CALIBRATION | 2 AFTER AUTO CALIBRATION | 3 BEFORE AUTO CALIBRATION | 3 AFTER AUTO CALIBRATION |
| POINT1 | 39.41% | 18.02% | 7.64% | 6.09% | 69.75% | 41.99% |
| POINT2 | 41.05% | 16.99% | 14.86% | 1.19% | 86.69% | 55.38% |
| POINT3 | 22.17% | 8.19% | 4.97% | 12.72% | 84.15% | 22.31% |
| POINT4 | 34.61% | 12.21% | 16.01% | 1.45% | 42.03% | 12.35% |
| POINT5 | 37.44% | 12.92% | 8.20% | 8.49% | 49.40% | 18.35% |
| POINT6 | 25.32% | 5.65% | 3.78% | 15.04% | 47.20% | 8.03% |
| POINT7 | 44.14% | 17.66% | 28.84% | 9.74% | 22.65% | 3.44% |
| POINT8 | 36.82% | 8.78% | 20.53% | 1.60% | 21.01% | 4.45% |
| POINT9 | 28.65% | 9.23% | 7.47% | 17.75% | 21.18% | 11.16% |
| POINT10 | 45.89% | 0.81% | 35.90% | 7.48% | 7.58% | 29.01% |
| POINT11 | 46.78% | 6.47% | 31.30% | 3.98% | 2.32% | 25.70% |
| POINT12 | 27.57% | 18.08% | 8.07% | 20.64% | 0.41% | 25.79% |
| POINT13 | 53.73% | 6.55% | 50.57% | 3.30% | 13.97% | 30.29% |
| POINT14 | 46.93% | 6.36% | 38.42% | 8.72% | 8.41% | 25.00% |
| POINT15 | 24.32% | 18.90% | 7.08% | 21.02% | 5.73% | 33.31% |
| AVERAGE ERROR | 36.99% | 11.12% | 18.91% | 9.28% | 32.17% | 23.10% |
| MAX ERROR | 53.73% | 18.90% | 50.57% | 21.02% | 86.69% | 55.38% |

FORCE SENSOR RECALIBRATION

CROSS-REFERENCE TO RELATED APPLICATIONS

This application claims the benefit of U.S. Provisional Patent Application Ser. No. 62/311,621, filed Mar. 22, 2016, which is incorporated by reference in its entirety.

BACKGROUND

Field of the Disclosure

Embodiments of the present disclosure generally relate to a method and apparatus for touch sensing, and more specifically, to processing a received signal.

Description of the Related Art

Input devices including proximity sensor devices (also commonly called touchpads or touch sensor devices) are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a method for operating an input device that includes measuring a force level at each of a first electrode and a second electrode. The method also includes determining an expected force level at the second electrode based on the measured force level at the first electrode and a force contribution ratio for the second electrode. The method includes determining a difference between the measured force level at the second electrode and the expected force level at the second electrode and adjusting a force weighting factor for the second electrode in response to the difference exceeding a predetermined threshold to create an adjusted force weighting factor. The method also includes adjusting the measured force level at the second electrode.

In another embodiment, a processing system for a capacitive sensing device is provided that includes a calibration module configured to measure a force level at each of a first electrode and a second electrode. The calibration module is further configured to determine an expected force level at the second electrode based on the measured force level at the first electrode and a force contribution ratio for the second electrode. The calibration module is further configured to determine a difference between the measured force level at the second electrode and the expected force level at the second electrode and adjust a force weighting factor for the second electrode in response to the difference exceeding a predetermined threshold to create an adjusted force weighting factor. The calibration module is further configured to adjust the measured force level at the second electrode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only sample embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide techniques for calibrating a force sensor of a touch device. Force is calculated based on displacement of a force sensor relative to ground. The physical properties of a touch device and a force sensor can change over time. For example, a user may drop the device on a hard surface, which can cause mechanical damage. Temperature changes and other environmental changes may also affect the physical properties of the device. These physical changes can affect the force measurements made by the force sensor. To compensate for these changes, the force sensor can be recalibrated periodically during runtime. In embodiments described herein, a weighting factor for each force electrode can be adjusted to compensate for these physical changes.

Figure 1:
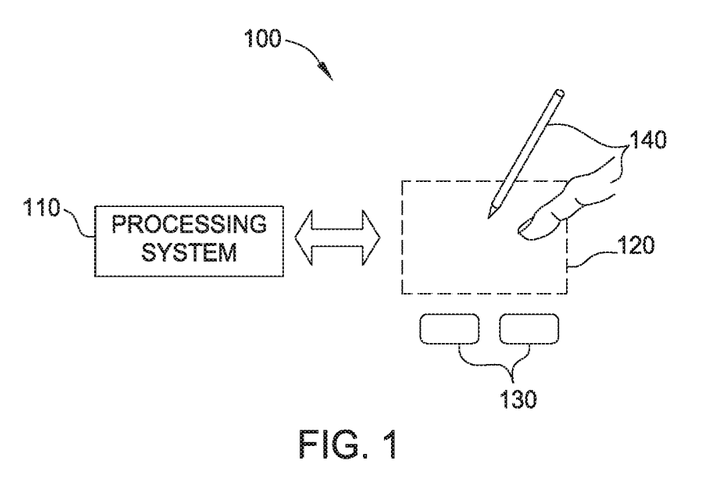
FIG. 1 is a block diagram of a system that includes an input device according to an embodiment.

Turning now to the figures, FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
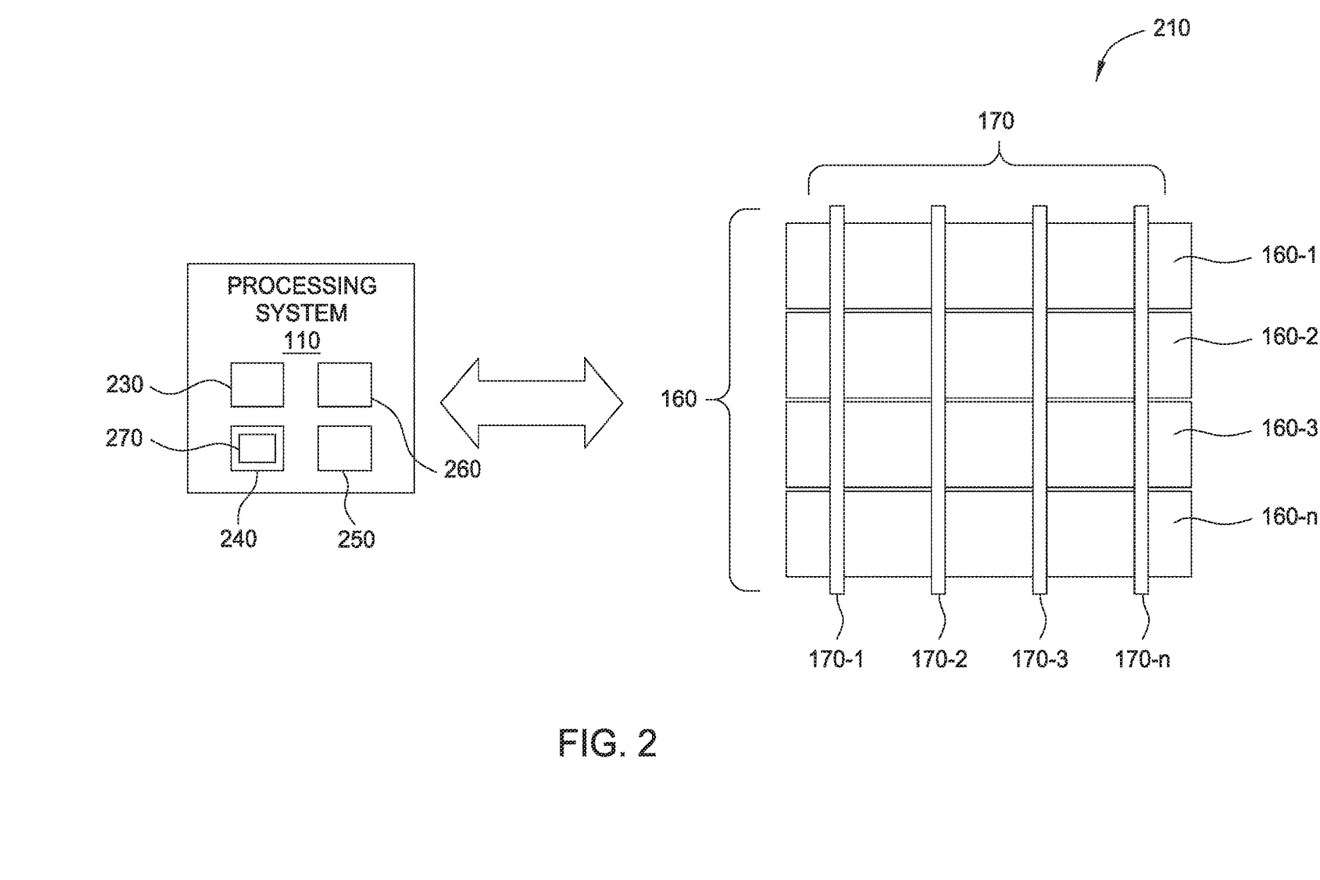
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of sensor electrodes 160.

Figure 3:
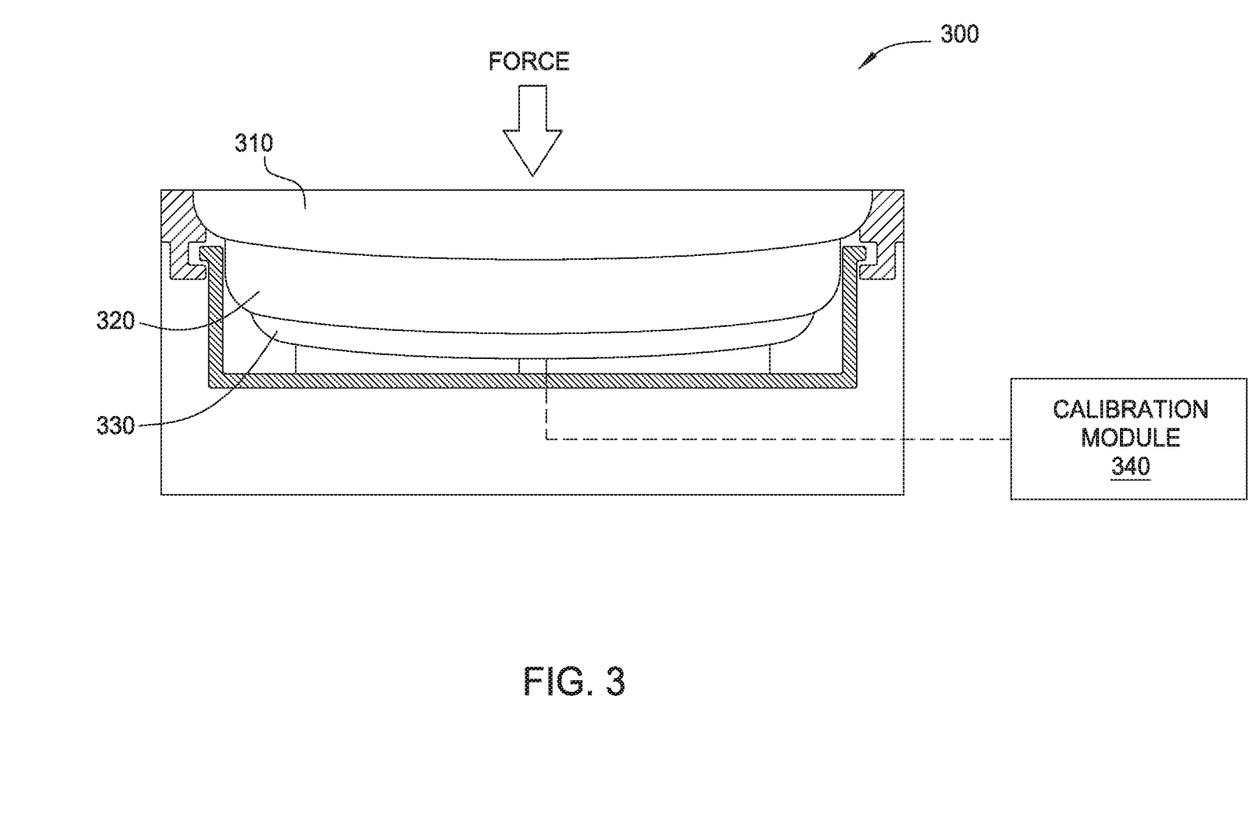
FIG. 3 illustrates an example processing system for calibrating capacitive force sensors.

Although not illustrated in FIG. 2, a separate force sensor can be placed underneath the display screen by disposing force sensing electrodes there. Embodiments described herein may use such a separate force sensor to sense force. An example force sensor 330 is illustrated in FIG. 3 below. In other embodiments, the sensor electrodes as described herein with respect to FIG. 2 are used to sense force.

Sensor electrodes 160 and sensor electrodes 170 may be ohmically isolated from each other. That is, one or more insulators separate sensor electrodes 160 and sensor electrodes 170 and prevent them from electrically shorting to each other. In some embodiments, sensor electrodes 160 and sensor electrodes 170 are separated by insulative material disposed between them at cross-over areas; in such constructions, the sensor electrodes 160 and/or sensor electrodes 170 may be formed with jumpers connecting different portions of the same electrode. In some embodiments, sensor electrodes 160 and sensor electrodes 170 are separated by one or more layers of insulative material. In some other embodiments, sensor electrodes 160 and sensor electrodes 170 are separated by one or more substrates; for example, they may be disposed on opposite sides of the same substrate, or on different substrates that are laminated together.

In other embodiments, one or more of sensor electrodes 160 or 170 are disposed on the same side or surface of the common substrate and are isolated from each other in the sensing region 120. The sensor electrodes 160 and 170 may be disposed in a matrix array where each sensor electrode may be referred to as a matrix sensor electrode. Each sensor electrode may be substantially similar in size and/or shape. In one embodiment, one or more sensor electrodes of the matrix array of sensor electrodes 160 and 170 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled to a separate capacitive routing trace of a plurality of capacitive routing traces. In various embodiments, the sensor electrodes 160 or 170 comprise one or more grid electrodes disposed between at least two sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

The areas of localized capacitive coupling between sensor electrodes 160 and sensor electrodes 170 may be termed "capacitive pixels." The capacitive coupling between the sensor electrodes 160 and sensor electrodes 170 change with the proximity and motion of input objects in the sensing region associated with the sensor electrodes 160 and sensor electrodes 170.

In some embodiments, the sensor pattern is "scanned" to determine these capacitive couplings. That is, the sensor electrodes 160 are driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and effectively produce an effectively larger sensor electrode, or these multiple sensor electrodes may transmit different transmitter signals. For example, multiple sensor electrodes may transmit different transmitter signals according to one or more coding schemes that enable their combined effects on the resulting signals of sensor electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each sensor electrode 160 comprises one or more common electrodes. In other embodiments, at least two sensor electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a sensor module 240, a determination module 250, and an optional memory 260. The processing system 110 is coupled to sensor electrodes 170 and sensor electrodes 160 through a plurality of conductive routing traces (not shown in FIG. 2).

The sensor module 240, which includes sensor circuitry, is coupled to the plurality of sensor electrodes 170 and configured to receive resulting signals indicative of input (or lack of input) in the sensing region 120 and/or of environmental interference. The sensor module 240 may also be configured to pass the resulting signals to the determination module 250 for determining the presence of an input object and/or to the optional memory 260 for storage. Sensor module 240 may also drive sensor electrodes. In various embodiments, the IC of the processing system 110 may be coupled to drivers for driving the sensor electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs may be achieved through a synchronization mechanism, which sequences the signals provided to the sensor electrodes 160. Alternatively the synchronization mechanism may be internal to any one of the ICs.

Processing system 110 may also comprise a receiver 270 that interfaces sensors to other components. The receiver 270 may comprise an analog front end (AFE) in some embodiments, and will be referred to as AFE 270 in this example embodiment for convenience. Other receiver implementations may be used in other embodiments. The AFE 270 may be embodied in sensor module 240 or in one or more other components of processing system 110.

Embodiments described herein provide techniques for calibrating force detection on an input device 100. Force detection based on a capacitive sensor with an air gap operates by measuring the change in capacitance that occurs when a force changes the width of the air gap. The amount of force detected is based on the amount of change in the width of the air gap. One challenge in measuring force using this method is that the mechanics of the input device 100 can change over time. For example, the device could be dropped onto a hard surface. The air gap or the display could change. Changes in temperature or humidity can also affect the device, as can normal wear and tear. If a permanent mechanical change occurs, force measurements can become inaccurate. Accurate force measurements can be regained by recalibrating the force sensor. In the approach described below, a weighting factor for each force electrode can be adjusted to compensate for these mechanical changes.

To recalibrate the force sensor, a reference force is measured during an initial calibration of the input device 100. Then, when the input device 100 is in use, one of the force electrodes is used as a reference to recover or partially recover the measured force from the mechanical changes. This process is described in further detail below.

FIG. 3 illustrates an example processing system 300 for calibrating capacitive force sensors. A force is applied to a touch surface 310 and a touch sensing module 320 acquires a change of capacitance at a plurality of sensor electrodes in a capacitive sensor. The touch sensing module 320 may include sensor electrodes 160 and 170 as described above, which operate to sense touch in a sensing region. The touch sensing module 320 identifies the coordinate location of the force in coordination with sensor module 240.

A force sensor 330 is configured to determine the amount of force based on a change of capacitance. The force sensor 330 determines the amount of force at a plurality of force sensing electrodes distributed across the force sensor 330. The force sensor 330 comprises one or more force sensing elements, such as force sensing electrodes described in further detail below. The movement of force sensor 330 is used to detect a force applied to the touch surface 310. Force can be determined by detecting a change in capacitance between the force sensor 330 and ground in one example. In any of the embodiments described herein, force sensing can be accomplished with either transcapacitance sensing or absolute capacitance sensing. A force sensing element can be driven for absolute capacitance sensing while another force sensing element is driven with a constant voltage. In addition, a second force sensing element (or an electrode of a second force sensing element) can be driven with a constant voltage or modulated differently (phase, amplitude, and/or frequency) from a first force sensing element (or an electrode of the first force sensing element). For transcapacitance sensing, a force sensing element can operate by detecting the capacitive coupling between one or more transmitter sensor electrodes and one or more receiver sensor electrodes. The transmitter sensor electrodes and receiver sensor electrodes may be arranged in various configurations.

The calibration module 340 is configured to implement aspects of the embodiments described herein. The calibration module 340 comprises appropriate circuitry and/or logic to implement these embodiments. The calibration module 340 may comprise parts of, or all of, one or more integrated circuits (ICs) and/or other circuitry components. In some embodiments, the calibration module 340 also comprises electronically-readable instructions, such as firmware code, software code, and/or the like. The calibration module 340 receives changes of capacitance that represent force readings from the force sensor 330. The calibration module can also read to and write from memory and/or registers to implement the embodiments described herein. The calibration module 340 can compare the changes of capacitance that represent force readings to expected force readings based on stored data, including stored data regarding one or more force sensing electrodes. The calibration module 340 can perform calculations using stored data and/or collected data as described herein, utilizing appropriate hardware, firmware, and/or software.

Figure 4:
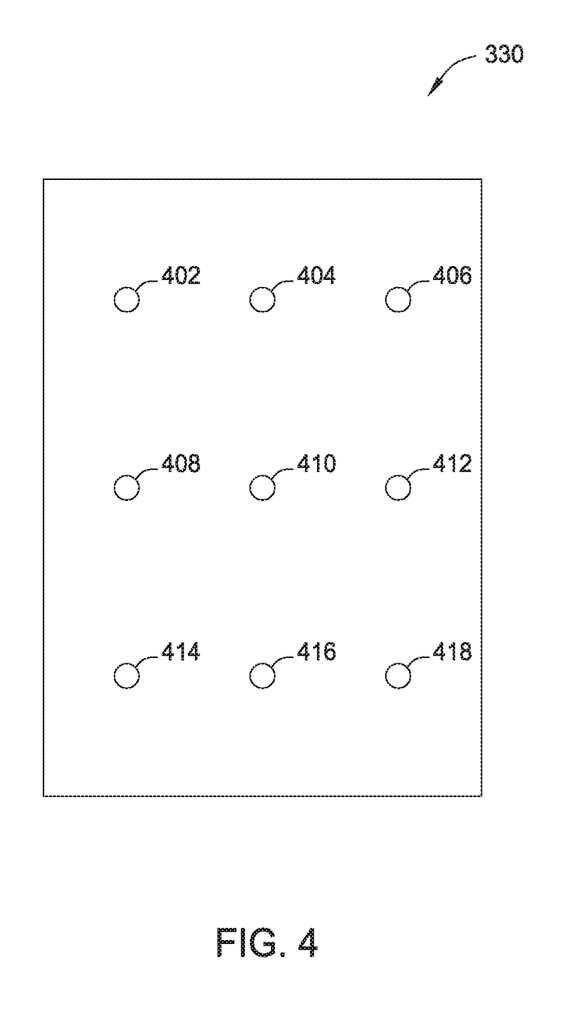
FIG. 4 illustrates an example distribution of force sensing electrodes on a force sensor.

FIG. 4 illustrates an example distribution of force sensing electrodes on a force sensor 330. Nine force sensing electrodes are illustrated here, but any suitable number of force sensing electrodes may be used in other embodiments. The example distribution of nine force sensing electrodes is used for embodiments described herein. The force sensing electrodes are numbered from 402 to 418 and are located at positions (i, j) on force sensor 330. When a force is applied at any point on the force sensor 330, each individual force sensing electrode senses and measures the force $f_{ij}$ at that respective electrode. Then the sum of the forces $f_{ij}$ measured at each electrode provides a measurement of the total force that was applied to the force sensor 330. For example, if a force $F_{total}$ is applied to the force sensor 330 at or near the location of force sensing electrode 410, force sensing electrode 410 will sense a portion of the force $F_{total}$. The other eight force sensing electrodes will also sense a portion of the force $F_{total}$. The force $F_{total}$ is determined by summing the individual force electrode responses.

$$F_{total} = \Sigma f_{ij}$$

Because the force $F_{total}$ was applied near the force sensing electrode 410 (the center electrode) in this example, the force sensing electrode 410 most likely provided the largest contribution to the sum of the individual force sensing electrode responses.

When an input device 100 is tested before it is sold to a retailer or a user, the force sensor 330 is calibrated so that each force sensing electrode is sensing and reporting the correct force applied to the force sensor 330. After a drop test of the input device 100, for example, the mechanics of the device may change and the force sensing electrodes may no longer report the correct force measurement. However, an electrode or electrodes near the center of the force sensor 330 (such as force sensing electrode 410 in this example) usually undergo less change than the other force sensing electrodes that are closer to the edges of force sensor 330. That is, the force measurements from the center electrode vary less than the measurements from other electrodes after the device undergoes mechanical changes. Because of this, the center electrode can be used as a reference to recalibrate the other force sensing electrodes when the device undergoes mechanical changes after it is used by a user. The electrode that is used as a reference to recalibrate the other electrodes may be referred to as a "golden electrode." In other embodiments, any other force sensing electrode besides the center electrode may be designated as the golden electrode, depending on which electrode undergoes less measurement variation because of the mechanical changes.

In an embodiment described herein, during calibration a force measurement is taken at each force sensing electrode when a reference force $F_{total}$ is applied at or near the golden electrode (in this example, the force sensing electrode 410). The individual force response of the golden electrode and each of the other force sensing electrodes is stored in the input device 100 and used as a reference for calibration. The calibration module 340 may store these measurements in any suitable location.

In addition, the expected contribution of each force sensing electrode to the overall force $F_{total}$ is denoted by $r_{ij}$ (the force contribution ratio). Consequently:

$$r_{ij} = \frac{f_{ij}}{F_{total}}$$

The sum of every force contribution ratio $r_{ij}$ equals 1. If the force $F_{total}$ is applied at the center force sensing electrode 410, a portion of that force $F_{total}$ is detected by each force sensing electrode, and the total force detected by the force sensing electrodes adds up to $F_{total}$. For example, 44% of the force may be detected at the center force sensing electrode 410, while 7% is detected at each of the other eight force sensing electrodes, for a total of 100%. If those example force measurements are determined during calibration, then $r_{ij}$ for the center force sensing electrode 410 would be 0.44, and $r_{ij}$ for each of the other eight force sensing electrodes would be 0.07. These ratios correspond to a force equal to or approximately equal to $F_{total}$ applied at the center force sensing electrode 410. A force applied elsewhere on the input device 100 might result in a different set of $r_{ij}$ values for each force sensing electrode. The set of $r_{ij}$ values determined during calibration is saved and used to recalibrate the force sensing device at a future time when a force approximately equal to $F_{total}$ is detected at or near the force sensing electrode 410.

Each force sensing electrode also has an associated weighting factor $k_{ij}$. The weighting factor $k_{ij}$ is initially set to 1 for each force sensing electrode during calibration. During recalibration, these weighting factors can be changed to compensate for the mechanical changes of the input device 100 and the force sensor 330. Calibration module 340 stores the ratios r and the weighting factors k for each force sensing electrode in any suitable location. The r and k values may be stored in a register in some embodiments.

During runtime, the input device 100 can be recalibrated when a force is applied that is similar to the calibration force.

That is, when a force approximately equal to $F_{total}$ is applied at or near the center force sensing electrode 410, the input device 100 can be recalibrated. The responses of the force sensing electrodes to this applied force $F_{total}$ can be compared to the "expected" responses of the force sensing electrodes based on the ratios r and the weighting values k determined during calibration and stored by calibration module 340. Based on that comparison, the force weighting values k for the force sensing electrodes can be adjusted to compensate for mechanical changes.

As an example, an input device 100 is calibrated with a force $F_{total}$ of 100 at the center force sensing electrode 410. The input device 100 can be programmed to perform recalibration when a force within a predetermined range around $F_{total}$ is applied within a predetermined area around the golden electrode, in this case the center force sensing electrode 410. Any suitable ranges can be used for the applied force and the area around the golden electrode. For instance, recalibration may be performed if the applied force $F'_{total}$ is within 10% of the calibration force $F_{total}$ and the applied force $F'_{total}$ is applied within a range of one centimeter from the (x,y) coordinates of the golden electrode (one centimeter may be considered "near" the center electrode in one embodiment). Other ranges may be used in other embodiments. In another embodiment, an applied force is considered near the center electrode if the applied force is closer to the center electrode than to any other force sensing electrode.

To use a simple example, during runtime, a force $F'_{total}$ of an amount 100 is applied at a position within the predetermined range of the center force sensing electrode 410. Because the force $F'_{total}$ is within 10% of the calibration force and the location of the force is within 1 cm of the center force sensing electrode 410, the input device 100 can be recalibrated at this time. Force measurements are taken at each of the nine force sensing electrodes. Because this force $F'_{total}$ is equal to the total calibration force, the force values detected of each of the nine force sensing electrodes is expected to be approximately equal to the values that were determined during the initial calibration. If the force $F'_{total}$ applied during recalibration were 10% above the initial calibration force, the force values detected at each of the nine force sensing electrodes would be expected to be 10% higher. The ratio values $r_{ij}$ of each of the force sensing electrodes determined during calibration for the calibration force $F_{total}$ applied at the calibration location (i.e., at the golden electrode) are assumed to be constant for the recalibration calculations. That is, $$r_{ij} = \frac{f'_{ij}}{F'_{total}}$$

where $F'_{total}$ is the total force applied and detected for the recalibration process and $f'_{ij}$ is the force detected by the force sensing electrode located at location (i,j).

During the recalibration process, the force at the golden electrode is determined ($f_{golden}$). The ratio value of the golden electrode is represented by $r_{golden}$. Because it is assumed that the force at the golden electrode is the most accurate, that force is used to determine an expected total force $F_{exp}$ applied to the input device 100 with the following formula:

$$F_{exp} = \frac{f_{golden}}{r_{golden}}$$

Then, for each force sensor electrode located at location (i,j), $$\frac{f_{ij}}{r_{ij}}$$

is computed. These values are compared to $F_{exp}$, which was determined at the golden electrode as described above. If a given value of $$\frac{f_{ij}}{r_{ij}}$$

at a location (i,j) differs from $F_{exp}$ by more than a predetermined threshold, then the force sensor at location (i,j) is recalibrated. The goal for each force sensor electrode that is recalibrated is for $$\frac{f_{ij}}{r_{ij}}$$

to approximately equal $F_{exp}$. This goal is achieved by updating the weighting factor k for each force sensor electrode that needs to be recalibrated. If $k_{ij}$ denotes the weighting factor for a force sensor electrode at location (i,j), then $k'_{ij}$ denotes the updated weighting factor. The updated weighting factor $k'_{ij}$ is selected so that:

$$k'_{ij} \frac{f_{ij}}{r_{ij}} = F_{exp}$$

Solving for $k'_{ij}$, and substituting $$\frac{f_{golden}}{r_{golden}}$$

for $F_{exp}$:

$$k'_{ij} = \frac{f_{golden}}{r_{golden}} \frac{r_{ij}}{f_{ij}}$$

Therefore the new weighting factor $k'_{ij}$ can be determined by the force measured at the golden force sensor electrode, the force measured at the force sensor electrode at location (i,j), and the r values for those two locations. When the new weighting factor k' is calculated for each force sensor electrode that requires recalibration, that new weighting factor is stored in memory by calibration module 340. As noted above, the weighting factors are only re-computed when the force detected at a given force sensor electrode is outside a certain predetermined range. For example, a force detected at a force sensor electrode that is only off by 10% or less of the expected force at that force sensor electrode may be determined to be within an acceptable range. Noise and other random effects may slightly alter the values detected by the force sensor electrodes, so a force measurement within a certain range is often acceptable to prevent excessive recalibration.

After the new weighting factor k'$_{ij}$ is determined, the future force measurements at the force sensing electrode located at position (i,j) are multiplied by the new weighting factor to determine the force applied to the input device 100. As an example, a force of 50 (which is close to the calibration force in this example) is detected near the golden force sensing electrode, which has an r of 0.5. Therefore the F$_{exp}$ is 50/0.5, or 100. A force of 3 is detected at touch sensing electrode 414, located in the bottom right corner of the force sensor 330 in FIG. 4. If the r value of touch sensing electrode 414 is 0.08, then f$_{ij}$/r$_{ij}$=3/0.08=37.5. Because the value 37.5 is far from the F$_{exp}$ value of 100, touch sensing electrode 414 should be recalibrated. The new weighting factor is found via:

$$k'_{ij} = \frac{f_{golden}}{r_{golden}} \frac{r_{ij}}{f_{ij}}$$

Therefore:

$$k'_{ij} = \frac{50}{0.5} \times \frac{0.08}{3}$$

The new weighting factor k'$_{ij}$=2.67. The default weighting factor was 1, so this updated weighting factor is stored in memory by calibration module 340. For future force measurements, the force detected by the touch sensing electrode 414 is multiplied by the weighting factor k of 2.67 and summed with force measurements from the other touch sensing electrodes to determine the total force that was applied to the force sensor 330. Consequently, if a subsequent force of 3 is detected at touch sensing electrode 414, a force of 3×2.67≈8 is used as the contribution of this force sensing electrode to the total applied force. The weighting factor helps to partially account for mechanical changes in the input device 100.

In some embodiments, a filter can be used to slowly alter the value of k for a given force sensing electrode instead of modifying k by a large amount in one step. For example, a given recalibration process may indicate that k should be changed from 1 to 5. However, a large rate of change such as this could lead to an overcorrection in the k value. Due to noise, mechanical variation, and other irregularities, the new k value may change the weighting factor too much, so a slower rate of change can be implemented instead using a filtering value. Then, if that change is not enough, the k value can be updated again during the next recalibration.

Implementing a filter for the k value can be performed with any suitable method. One method is to multiply the change in the k value by an amount less than 1, denoted by α (the filtering value). For example, if α=0.5, and the recalibration process determines that k should be changed from 1 to 5, then the updated k$_{ij}$ is found by:

$$k_{ij_{new}} = \alpha \frac{k'_{ij}}{k_{ij}}$$

Thus, the updated k$_{ij}$ equals 0.5×(5/1), or 2.5. Consequently, k was updated to 2.5 instead of 5, resulting in a slower rate of change in the value of k. Another equation that can be used to filter k is:

$$k_{ij_{new}} = (1-\alpha)k_{ij} + \alpha k'_{ij}$$

Using this equation and the values above for α and k'$_{ij}$, the new k$_{ij}$ value is 0.5(1)+0.5(5), or 3. If, for example, α was 0.8, a greater rate of change would result in the new k$_{ij}$ value: 0.2(1)+0.8(5), or 4.2. Different values of α may be used depending on the desired aggressiveness of changes to k.

After new k values have been determined during a recalibration process for each force sensing electrode that requires recalibration, the force measurements for each force sensing electrode are summed to determine the total force. Therefore:

$$F_{total} = \Sigma k'_{ij} f_{ij}$$

Figure 5:
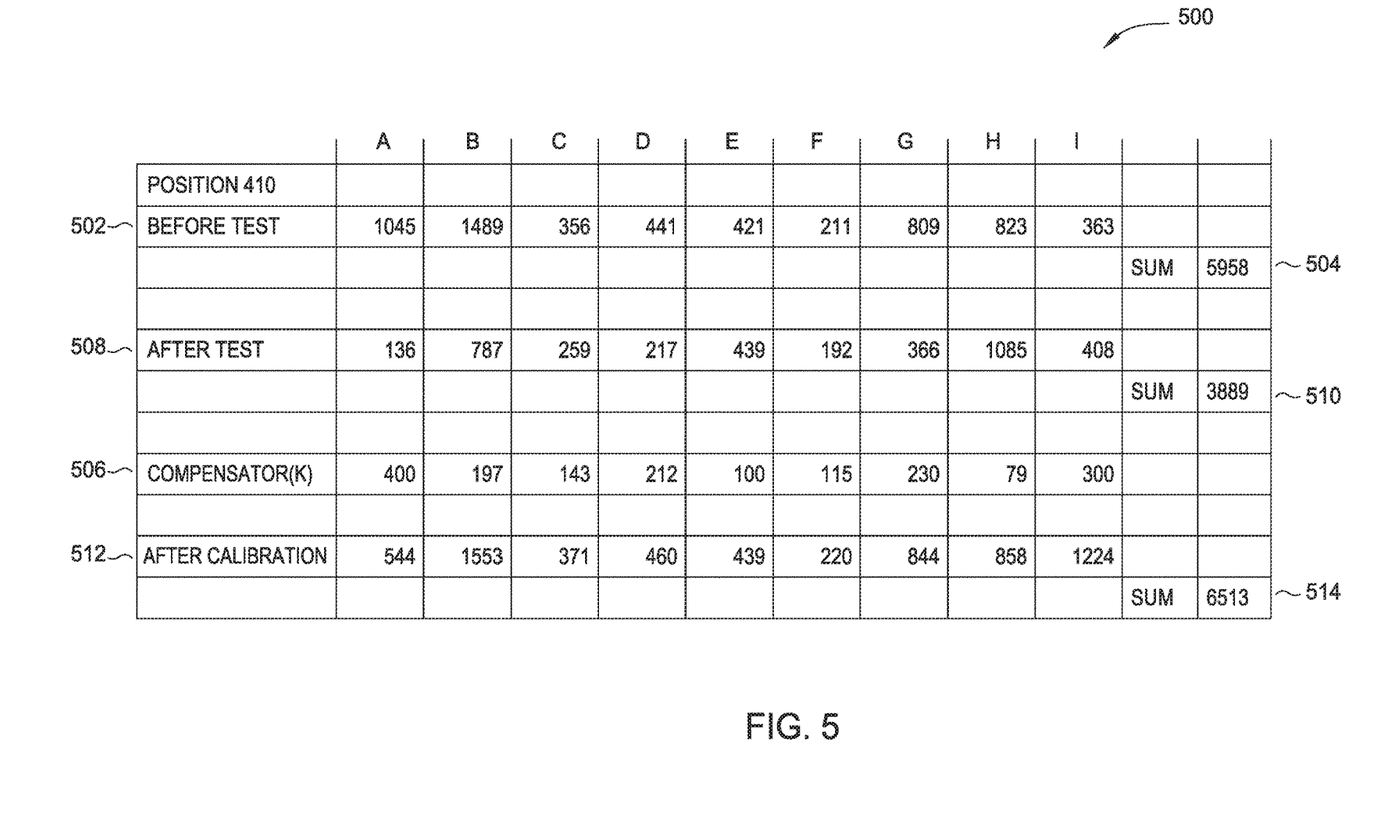
FIG. 5 illustrates an example table that shows recalibrated force measurements.

FIG. 5 illustrates an example table 500 that shows recalibrated force measurements based on a force applied near a golden electrode, such as the center force sensing electrode 410 illustrated in FIG. 4. The recalibrated improvements to the force measurements illustrated in FIG. 5 may be more or less using other input devices in other environments. The result shown here is only one example embodiment. In this example, nine force sensing electrodes are shown in columns A though I. Force measurements were taken before a battery of tests was performed on the input device 100. The battery of tests may include, for example, a drop test of the input device 100 that can alter the physical properties of the force sensor in the device. These "before" force measurements for the nine force sensing electrodes are illustrated in row 502. The force measurements in row 502 are used as the baseline to determine how large the error is before and after recalibration. Row 504 illustrates the sum of the force measurements in row 502 (5958). Row 506 illustrates the k values (shown in percentages) for the force measurements to be used during recalibration. The k value for column E is 100%, which indicates that the force sensor denoted in column E is the "golden" electrode in this example.

Row 508 illustrates the force sensor measurements for each force sensing electrode after the battery of tests is performed. As seen in row 508, after the battery of tests was performed on the device, these "after" force sensor measurements vary greatly from the "before" measurements in row 502. For example, in column B, the "before" test measured a force of 1489, while the "after" test measured a force of 787. Similarly, in column G, the "before" test measured 809 and the "after" test measured 366. The sum of the force measurements in the "after" test is illustrated in row 510 (3889). Therefore, the error between the "before" and "after" tests is (5958-3889)/5958, or about 35%.

Row 512 illustrates the force sensor measurements when the "after" measurements (row 508) are multiplied by the weighting factors k (row 506) for each force sensing electrode. For example, in column A, the "after" measurement of 136 is multiplied by the k factor of 400% to produce a recalibrated measurement of 544. Similarly, the column B "after" measurement of 787 is multiplied by the k value of 197% for column B, which results in a recalibrated force measurement of 1553. After each of the force sensor measurements have been recalibrated, the sum of those recalibrated measurements is shown in row 514. The recalibrated sum is 6513. The error between the "before" sum and the recalibrated sum is (6513-5958)/5958, or about 9.3%. Therefore, using the recalibration process described herein resulted in reducing the error from about 35% to about 9% in this example.

Figure 6:
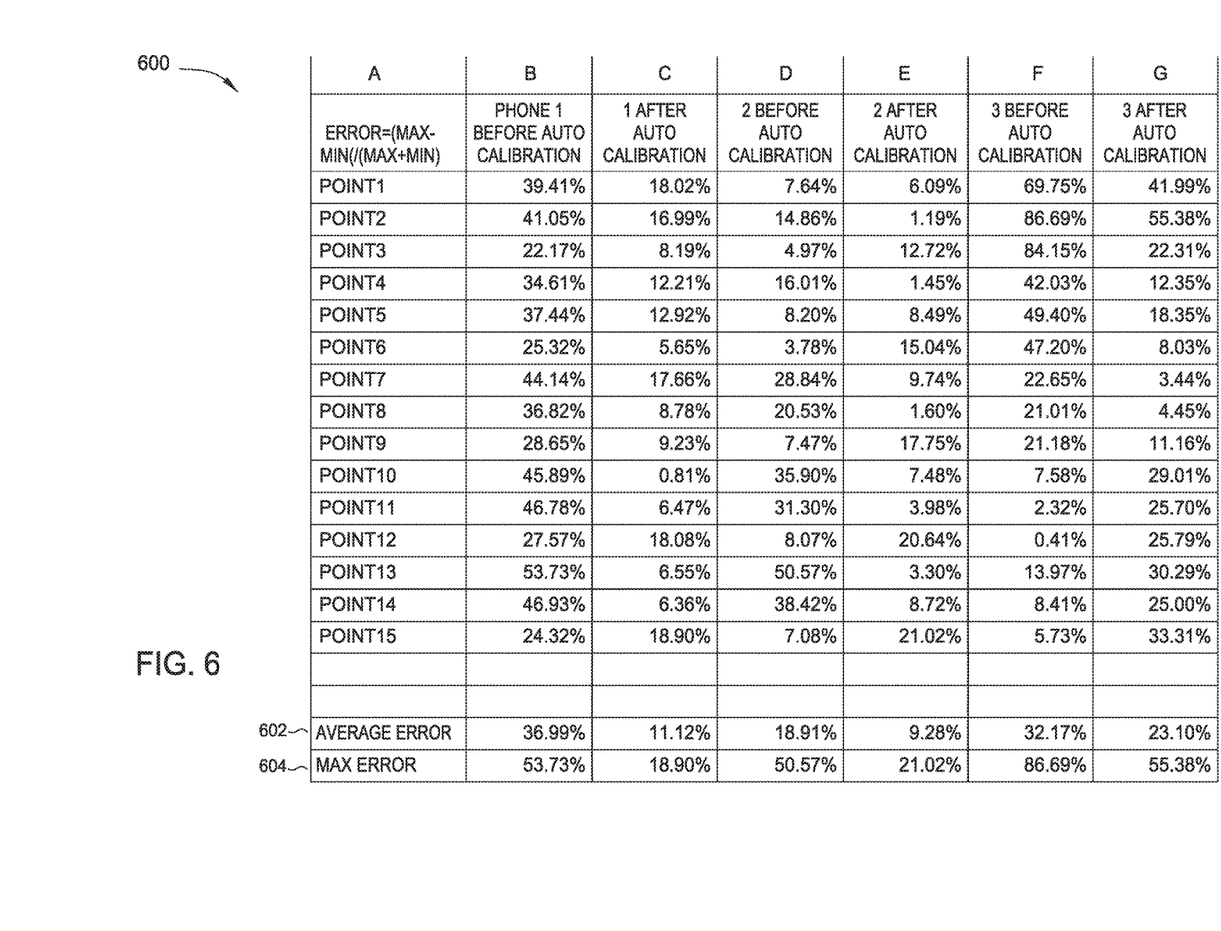
FIG. 6 illustrates an example table that shows testing results of three sample devices before and after recalibration of the three devices.

FIG. 6 illustrates an example table 600 that shows testing results of three sample devices and associated force measurements before and after calibration of the three devices. The table illustrates 15 applications of a testing force at 15 different points on the devices (illustrated in column A as Point1, Point2, etc.). For example, a force was applied at Point1 on each of the three devices both before and after calibration. The table shows the error in the force measurements before and after calibration. Other applications of the embodiments described herein may result in different amounts of improvement to the force sensor measurements.

Columns B and C illustrate the error measurements for phone 1 at each of the 15 different points. Columns D and E illustrate the error measurements for phone 2. Columns F and G illustrate the error measurements for phone 3. Row 602 displays the average of the error rates of the 15 different points for each column. For example, phone 1 has an average error rate of 36.99% before calibration and 11.12% after calibration. As seen in table 600, the average error improved for each of these three sample devices. Row 604 illustrates the maximum error for each device both before and after calibration. The maximum error also improved for each of the three sample devices.

Figure 7:
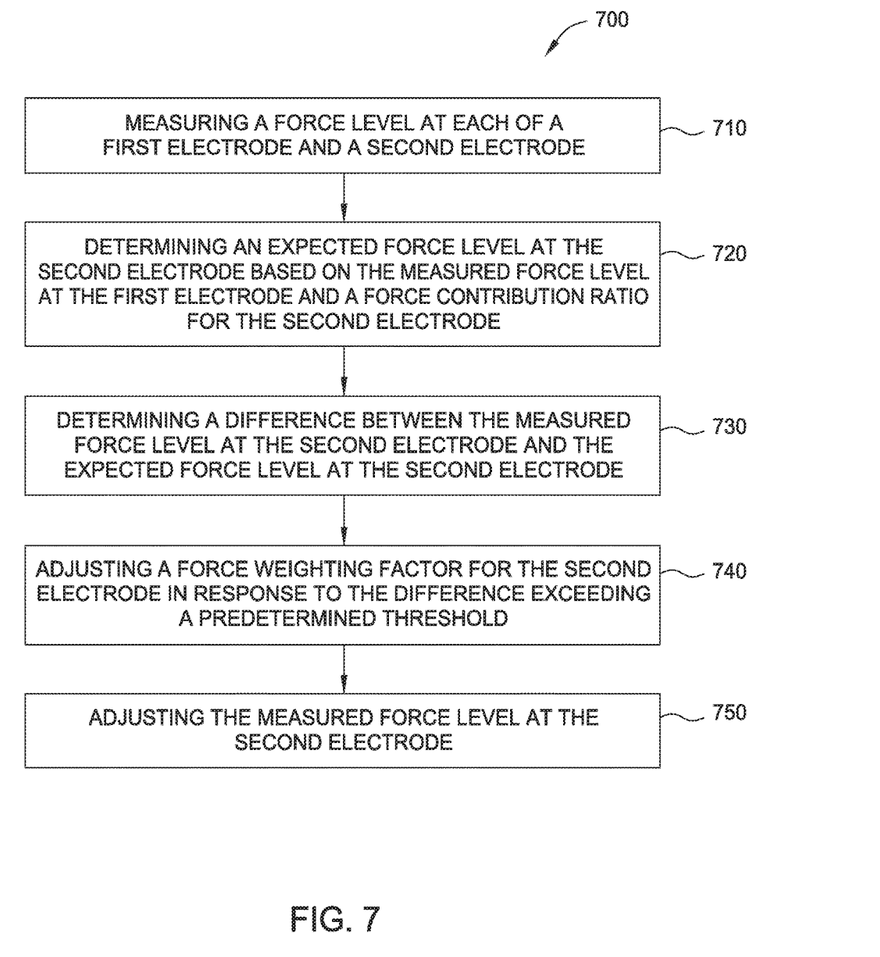
FIG. 7 is a flowchart illustrating a method for recalibrating capacitive force sensors.

FIG. 7 is a flow diagram illustrating a method 700 for calibrating capacitive force sensors. Although the method steps are described in conjunction with the systems of FIGS. 1-4, persons skilled in the art will understand that any system configured to perform the method steps, in any feasible order, falls within the scope of the present disclosure. In various embodiments, the hardware and/or software elements described above in FIGS. 1-4 can be configured to perform the method steps of FIG. 7. In some embodiments, the components illustrated in FIGS. 1-4, such as the force sensor electrodes and calibration module 340, may perform some or all of the steps in FIG. 7, utilizing hardware and/or software.

The method begins at step 710, where a force sensor measures a force level at each of a first and second electrode. Force can be measured in a variety of ways, including by measuring a change of capacitance as described above.

The method continues at step 720, where a calibration module determines an expected force level at the second electrode based on the measured force level at the first electrode and a force contribution ratio for the second electrode. As described above, the first electrode may be a golden electrode that is used to recalibrate the other force sensor electrodes, including the second force sensing electrode. The force contribution ratios r for each force sensor electrode may be stored in any appropriate memory or register.

The method continues at step 730, where the calibration module determines a difference between the measured force level at the second electrode and the expected force level at the second electrode. At step 740, a force weighting factor is adjusted by the calibration module in response to the difference exceeding a predetermined threshold. In other words, if the force measurement at the second electrode is far off of the expected measurement (i.e., it exceeds the threshold), the weighting factor is adjusted. If the difference is small, and the difference does not exceed the threshold, then the force weighting factor does not need to be adjusted.

The method continues at step 750, where the calibration module adjusts the measured force level at the second electrode. The adjustment is based at least in part on the adjusted force weighting factor.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method for recalibrating a force sensor, the method performed by one or more processors of an input device and comprising:
   detecting a first change in capacitance at a first electrode;
   detecting a second change in capacitance at a second electrode;
   measuring a force at each of the first electrode and the second electrode based at least in part on the detected first and second changes in capacitance, respectively;
   determining an expected force at the second electrode based at least in part on the measured force at the first electrode;
   determining a difference between the measured force at the second electrode and the expected force at the second electrode;
   adjusting a force weighting factor for the second electrode in response to the difference exceeding a predetermined threshold to create an adjusted force weighting factor; and
   adjusting the measured force at the second electrode using the adjusted force weighting factor, wherein the adjusted force weighting factor is based at least in part on the measured force at the first electrode and the measured force at the second electrode.

2. The method of claim 1, further comprising:
   determining a force contribution ratio for the second electrode during a calibration of the input device.

3. The method of claim 2, wherein determining the expected force at the second electrode further comprises:
   determining a total force on the input device based on the measured force at the first electrode; and
   multiplying the total force by the force contribution ratio associated with the second electrode.

4. The method of claim 1, wherein the first electrode is located near a center of the input device.

5. The method of claim 1, further comprising:
   saving the adjusted force weighting factor to a register; and
   adjusting a second force measurement at the second electrode using the adjusted force weighting factor.

6. The method of claim 1, wherein adjusting the force weighting factor further comprises:
   adjusting the force weighting factor so that the adjusted force weighting factor multiplied by the force measured at the second electrode approximately equals the expected force at the second electrode.

7. The method of claim 6, wherein adjusting the force weighting factor further comprises:
   adjusting the force weighting factor for the second electrode to a fraction of the adjusted force weighting factor.

8. The method of claim 1, wherein the force measured at the first electrode is approximately equal to a force measured during calibration of the input device.

9. A processing system for recalibrating a force sensor in an input device, comprising:
   processing circuitry; and
   a memory storing instructions that, when executed by the processing circuitry, cause the processing system to:
      detect a first change in capacitance at a first electrode;

detect a second change in capacitance at a second electrode;

measure a force at each of the first electrode and the second electrode based at least in part on the detected first and second changes in capacitance, respectively;

determine an expected force at the second electrode based at least in part on the measured force at the first electrode;

determine a difference between the measured force at the second electrode and the expected force at the second electrode;

adjust a force weighting factor for the second electrode in response to the difference exceeding a predetermined threshold to create an adjusted force weighting factor; and adjust the measured force at the second electrode using the adjusted force weighting factor, wherein the adjusted force weighting factor is based at least in part on the measured force at the first electrode and the measured force at the second electrode.

10. The processing system of claim 9, wherein execution of the instructions further causes the processing system to: determine a force contribution ratio for the second electrode during a calibration of the input device.

11. The processing system of claim 10, wherein execution of the instructions to determine the expected force at the second electrode causes the processing system to:

determine a total force on the input device based on the measured force at the first electrode; and multiply the total force by the force contribution ratio associated with the second electrode.

12. The processing system of claim 9, wherein the first electrode is located near a center of the input device.

13. The processing system of claim 9, wherein execution of the instructions further causes the processing system to:

store the adjusted force weighting factor to a register; and adjust a second force measurement at the second electrode using the adjusted force weighting factor.

14. The processing system of claim 9, wherein execution of the instructions to adjust the force weighting factor causes the processing system to:

adjust the force weighting factor so that the adjusted force weighting factor multiplied by the force measured at the second electrode approximately equals the expected force at the second electrode.

15. The processing system of claim 14, wherein execution of the instructions to adjust the force weighting factor further causes the processing system to:

adjust the force weighting factor for the second electrode to a fraction of the adjusted force weighting factor.

16. The processing system of claim 9, wherein the force measured at the first electrode is approximately equal to a force measured during calibration of the input device.

17. An input device for capacitive touch sensing, comprising:

a force sensor including a first electrode and a second electrode; and processing circuitry; and a memory storing instructions that, when executed by the processing circuitry, causes the input device to:

detect a first change in capacitance at the first electrode;

detect a second change in capacitance at the second electrode;

measure a force at each of the first electrode and the second electrode based at least in part on the detected first and second changes in capacitance, respectively;

determine an expected force at the second electrode based at least in part on the measured force at the first electrode;

determine a difference between the measured force at the second electrode and the expected force at the second electrode;

adjust a force weighting factor for the second electrode in response to the difference exceeding a predetermined threshold to create an adjusted force weighting factor; and adjust the measured force at the second electrode using the adjusted force weighting factor, wherein the adjusted force weighting factor is based at least in part on the measured force at the first electrode and the measured force at the second electrode.

18. The input device of claim 17, wherein execution of the instructions further causes the input device to:

store the adjusted force weighting factor to a register; and adjust a second force measurement at the second electrode using the adjusted force weighting factor.

19. The input device of claim 17, wherein execution of the instructions to determine the expected force at the second electrode causes the input device to:

determine a total force on the input device based on the measured force at the first electrode; and multiply the total force by a force contribution ratio associated with the second electrode.

20. The input device of claim 17, wherein execution of the instructions to adjust the force weighting factor causes the input device to:

adjust the force weighting factor so that the adjusted force weighting factor multiplied by the force measured at the second electrode approximately equals the expected force at the second electrode.

* * * * *